United States Patent
McCormick et al.

(10) Patent No.: US 10,315,753 B2
(45) Date of Patent: Jun. 11, 2019

(54) SYSTEM AND METHOD FOR CONTROLLING AIRCRAFT WING FLAP MOTION

(71) Applicant: THE BOEING COMPANY, Chicago, IL (US)

(72) Inventors: Patrick McCormick, Mukilteo, WA (US); James L. Peck, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 657 days.

(21) Appl. No.: 15/084,076

(22) Filed: Mar. 29, 2016

(65) Prior Publication Data

US 2017/0283039 A1     Oct. 5, 2017

(51) Int. Cl.
*B64C 13/50* (2006.01)
*B64C 9/22* (2006.01)
*B64D 45/00* (2006.01)

(52) U.S. Cl.
CPC ............... *B64C 13/50* (2013.01); *B64C 9/22* (2013.01); *B64D 2045/001* (2013.01); *Y02T 50/44* (2013.01)

(58) Field of Classification Search
CPC ................. B64C 13/50; B64D 2045/001
See application file for complete search history.

(56) References Cited

U.S. PATENT DOCUMENTS

| | | | |
|---|---|---|---|
| 7,048,234 B2 * | 5/2006 | Recksiek | B64C 13/503 244/213 |
| 7,556,224 B2 | 7/2009 | Johnson | |
| 8,164,283 B2 * | 4/2012 | Sheahan, Jr. | B60L 7/14 244/99.2 |
| 9,190,942 B2 * | 11/2015 | Polcuch | H02P 8/40 |
| 9,193,479 B2 | 11/2015 | Moy | |
| 2005/0029407 A1 * | 2/2005 | Pohl | B64C 9/16 244/221 |
| 2006/0289696 A1 | 12/2006 | Hanlon | |
| 2007/0108343 A1 * | 5/2007 | Wingett | B64C 13/28 244/99.3 |
| 2010/0170999 A1 | 7/2010 | Fervel | |

(Continued)

OTHER PUBLICATIONS

"Advanced High Lift System Architecture with Distributed Flap Actuation," Recksiekd, AST 2009 Workshop on Aviation System Technology, (2009).

*Primary Examiner* — Philip J Bonzell
*Assistant Examiner* — Michael B. Kreiner
(74) *Attorney, Agent, or Firm* — Joseph M. Butscher; The Small Patent Law Group, LLC

(57) ABSTRACT

A system and method for controlling one or more flaps of a wing of an aircraft include a first flap moveably secured to a first wing of the aircraft. The first flap is moveable between an extended position and a retracted position. First and second actuators are coupled to the first flap. A flap control unit is in communication with the first and second actuators. The flap control unit is configured to operate the first and second actuators to move the first flap between retracted and extended positions, monitor a first electrical signal provided to the first actuator, monitor a second electrical signal provided to the second actuator, and determine that the first and second actuators are synchronized by monitoring the first and second electrical signals.

20 Claims, 5 Drawing Sheets

(56) References Cited

U.S. PATENT DOCUMENTS

2011/0118906 A1    5/2011  Fervel
2015/0081102 A1*  3/2015  Kopp .................... B64C 13/30
                                                           700/275

* cited by examiner

SYSTEM AND METHOD FOR CONTROLLING AIRCRAFT WING FLAP MOTION

FIELD OF THE DISCLOSURE

Embodiments of the present disclosure generally relate to systems and methods for controlling flap motion of wings of an aircraft.

BACKGROUND OF THE DISCLOSURE

High-lift systems are utilized on wings of aircraft to increase lift or drag during take-offs and landings. One type of high-lift system includes flaps on leading and trailing edges of the wings. The flaps are moveable control surfaces that may be extended during take-offs and landings, and retracted at cruising speeds.

Typically, leading and trailing edge flaps are controlled through torque tubes. In particular, a first torque tube is coupled to multiple leading edge flaps of a wing, and a second torque tube is coupled to multiple trailing edge flaps of the wing. However, torque tubes add weight to an aircraft. Moreover, torque tubes expand the size of a wing in that each wing needs to be large enough to accommodate a torque tube.

As aircraft continue to develop, manufacturers seek to reduce the size and weight of various components of the aircraft. In short, lighter aircraft consume less fuel during operation.

SUMMARY OF THE DISCLOSURE

A need exists for a system and method that synchronizes flap motion of one or more wings of an aircraft. A need exists for a system and method that allows for lighter wing assemblies, and therefore lighter aircraft.

With those needs in mind, certain embodiments of the present disclosure provide a system for controlling one or more flaps of a wing of an aircraft. The system may include a first flap moveably secured to a first wing of the aircraft. The first flap is moveable between an extended position and a retracted position. First and second actuators may be coupled to the first flap. A flap control unit is in communication with the first and second actuators. The flap control unit may be configured to operate the first and second actuators to move the first flap between retracted and extended positions. monitor a first electrical signal provided to the first actuator, monitor a second electrical signal provided to the second actuator, and determine that the first and second actuators are synchronized by monitoring the first and second electrical signals.

In at least one embodiment, the flap control unit is configured to determine that the first and second actuators are synchronized when the first and second electrical signals are equal. In at least one embodiment, each of the first and second electrical signals is a voltage or a current.

The flap control unit may determine that the first and second actuators are synchronized without the use of a sensor. The first and second actuators may not be mechanically linked.

In at least one embodiment, the first actuator is a first stepper motor, and the second actuator is a second stepper motor.

The first flap may be a leading edge flap. In at least one other embodiment, the first flap may be a trailing edge flap.

The system may also include a second flap moveably secured to the first wing of the aircraft. The second flap is moveable between an extended position and a retracted position. Third and fourth actuators are coupled to the second flap. The flap control unit may further be configured to operate the third and fourth actuators to move the second flap between retracted and extended positions, monitor a third electrical signal provided to the third actuator, monitor a fourth electrical signal provided to the fourth actuator, and determine that the third and fourth actuators are synchronized by monitoring the third and fourth electrical signals.

The system may also include at least one power bus coupled to the first and second actuators. The power bus provides power signals to the first and second actuators from a source of power.

The system may also include at least one control bus that couples the flap control unit to the first and second actuators. The flap control unit provides control signals to the first and second actuators through the control bus.

Certain embodiments of the present disclosure provide a method of controlling one or more flaps of a wing of an aircraft. The method may include receiving a command signal that is input by an operator of the aircraft, operating first and second actuators coupled to a first flap of the wing of the aircraft based on the command signal to move the first flap between retracted and extended positions, monitoring a first electrical signal provided to the first actuator, monitoring a second electrical signal provided to the second actuator, and determining that the first and second actuators are synchronized based on the monitoring operations. The determining operation may include determining that the first and second actuators are synchronized when the first and second electrical signals are equal.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide a flap control system and method that is used to control leading and/or trailing edge flaps of wings of an aircraft. The flap control system includes actuators (such as electromechanical actuators) that are coupled to flaps. The actuators are in communication with one or more flap control units that control operation of the flaps.

Embodiments of the present disclosure provide a hydraulic-free, electronically-interconnected direct drive flap actuator control system for aircraft. Flap motion is synchronized without the use of a torque tube. The lack of hydraulic connections allows for installation and testing of flap actuation to be performed further upstream in a build sequence for a wing. Accordingly, the wing may be delivered to a final assembly location with a fully installed and tested flap system.

Embodiments of the present disclosure may be devoid of torque tubes and hydraulic actuation systems. Accordingly, embodiments of the present disclosure increase flexibility of component placement, improve control of the flaps, and lower the weight and complexity of a wing, for example.

In at least one embodiment, the flap control system and method includes a leading edge or trailing edge flap assembly for an airplane wing that includes a plurality of synchronous electromechanical motors that provide independent control of a particular flap. A synchronous motor may be coupled to each link (such as a lever or drive arm) of a flap. The motors may be connected to primary and secondary power sources as well as primary and redundant flap control units.

Figure 1:
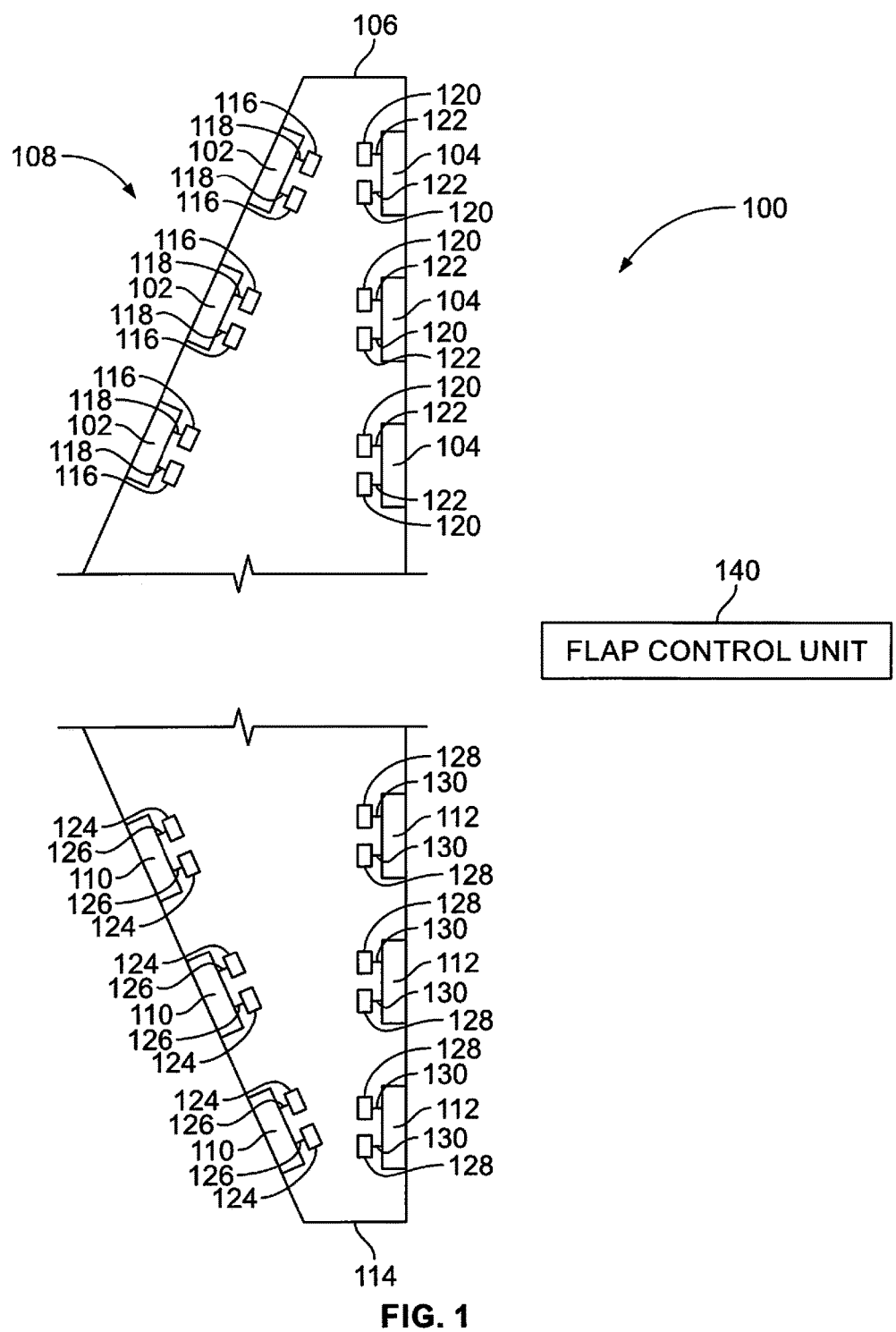
FIG. 1 is a diagrammatic representation of a schematic view of a flap control system, according to an embodiment of the present disclosure.

FIG. 1 is a diagrammatic representation of a schematic view of a flap control system 100, according to an embodiment of the present disclosure. The flap control system 100 includes leading edge flaps 102 and trailing edge flaps 104 on a wing 106 of an aircraft 108, and leading edge flaps 110 and trailing edge flaps 112 on an opposite wing 114 of the aircraft 108. Each wing 106 and 114 may include more or less leading edge and trailing edge flaps than shown.

Each of the leading edge flaps 102 is coupled to an actuator 116 through a link 118, while each of the trailing edge flaps 104 is coupled to an actuator 120 through a link 122. Similarly, each of the leading edge flaps 110 is coupled to an actuator 124 through a link 126, while each of the trailing edge flaps 112 is coupled to an actuator 128 through a link 130. As shown, each actuator 116, 120, 124, and 128 may be coupled to a respective flap 102, 104, 110, and 112 through a respective link 118, 122, 126, and 130. As shown, each of the flaps 102, 104, 110, and 112 is coupled to two respective actuators 116, 120, 124, and 128. Optionally, each of the flaps 102, 104, 110, and 112 may be coupled to more or less than two actuators. The links 118, 122, 126, and 130 may be levers, rods, arms, and/or the like that couple the actuators to the flaps.

The actuators 116, 120, 124, and 128 may be electromechanical actuators that are configured to actuate the flaps 102, 104, 110, and 112 between retracted and extended positions. Each of the actuators 116, 120, 124, and 128 is in communication with a flap control unit 140, such as through one or more wired or wireless connections. For example, the actuators 116, 120, 124, and 128 may be coupled to the flap control unit 140 through one or more wires, buses, wireless connections, and/or the like. The flap control unit 140 may be or include a single control unit that is configured to control operation of the flaps 102, 104, 110, and 112. In at least one other embodiment, the flap control unit 140 includes a plurality of controllers (for example, microcontrollers) that are configured to provide control redundancy.

Each of the actuators 116, 120, 124, and 128 may be or otherwise include a field-oriented motor. For example, the actuators 116, 120, 124, and 128 may be stepper motors. In at least one other embodiment, the actuators 116, 120, 124, and 128 may be drive stations, such as shown and described in U.S. Pat. No. 9,193,479, entitled "Monitoring of High-Lift Systems for Aircraft." Optionally, the actuators 116, 120, 124, and 128 may be various other types of devices that are used to move the flaps 102, 104, 110, and 112. For example, the actuators 116, 120, 124, and 128 may be or include powered pivotal harnesses, linkages, and/or the like. The actuators 116, 120, 124, and 128 may be secured within the wings 106 and 114. Optionally, the actuators 116, 120, 124, and 128 may be located within a fuselage of the aircraft 108, and coupled to the flaps 102, 104, 110, and 112 through links, couplings, and/or the like.

As shown in FIG. 1, the flaps 102 are not interconnected by a torque tube. The flaps 104 are not interconnected by a torque tube. The flaps 110 are not interconnected by a torque tube. The flaps 112 are not interconnected by a torque tube. Instead, the flap control unit 140 communicates with the actuators 116, 120, 124, and 128 through control signals that allow the flap control unit 140 to control operation of the flaps 102, 104, 110, and 112. There may be no mechanical interaction between the actuators 116, 120, 124, and 128. As such, the aircraft 108 may provide a distributed high-lift system.

Figure 2:
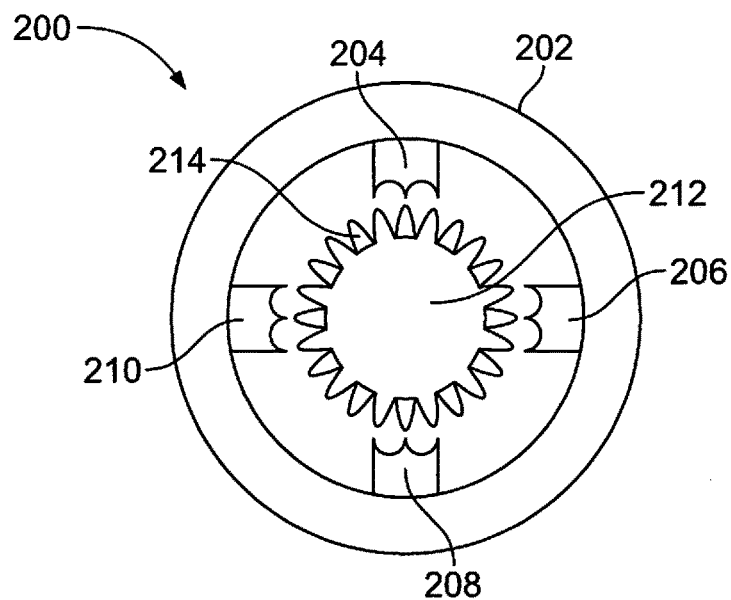
FIG. 2 illustrates a simplified end view of an actuator, according to an embodiment of the present disclosure.

FIG. 2 illustrates a simplified end view of an actuator 200, according to an embodiment of the present disclosure. Any of the actuators 116, 120, 124, and 128 shown in FIG. 1 may be configured as the actuator 200. The actuator 200 is a field-oriented motor, such as a stepper motor.

A stepper motor is a brushless direct current (DC) electric motor that divides a full rotation into a number of equal steps. The position of the stepper motor is configured to be commanded to move and hold at a particular step without any feedback sensor.

The actuator 200 includes an outer frame 202 that supports electromagnets 204, 206, 208, and 210. A rotor 212 is moveably positioned between the electromagnets 204, 206, 208, and 210. Optionally, the actuator 200 may include more or less electromagnets than shown. As power is provided to the electromagnet 204 (such as through a power bus), the rotor 212 is attracted thereto, and moves into an aligned position with the electromagnet 204. As the electromagnet 204 is de-energized, and power is provided to the electromagnet 206, the rotor 212 is attracted to the electromagnet 206, and moves into an aligned position with the electromagnet 206. The rotor 212 moves into attracted positions with each of the electromagnets 204, 206, 208, and 210 when energized, and the other electromagnets are de-energized.

The rotor 212 rotates continuously when DC voltage is applied to the electromagnets 204, 206, 208, and 210. As a stepper motor, the actuator 200 converts input pulses into a defined increment in the position of the rotor 212. Each pulse moves the rotor 212 through a fixed radial angle.

The electromagnets 204, 206, 208, and 210 may be energized by an external driver circuit or a microcontroller, for example. As the electromagnet 204 is emerged, teeth 214 of the rotor 212 are magnetically attracted to the electromagnet 204. When the teeth 214 of the rotor 212 are aligned to the electromagnet 204, the teeth 212 are slightly offset from the electromagnet 206. Accordingly, when the electromagnet 206 is energized and the electromagnet 204 is de-energized, the rotor 212 rotates into alignment with the electromagnet 206. The process repeats for the other electromagnets 208 and 210. Each rotation between electromagnets 204, 206, 208, and 210 is a step. A plurality of steps provides a full rotation. For example, as shown in FIG. 2, four steps may provide a full rotation.

Referring again to FIG. 1, each of the actuators 116, 120, 124, and 130 may be a stepper motor. As such, the actuators coupled to a single flap are automatically synchronized with one another. For example, the actuators 116 coupled to one flap 102 are automatically synchronized by virtue of the characteristics of the stepper motors themselves. For example, when the power provided to the actuators 116 (as stepper motors) is provided equally and at the same time (such as through one or more buses), the actuators 116 coupled to the flap 102 move at the same rate and at the same time. Therefore, separate and distinct position or motion sensors are not needed to synchronize motion of the actuators.

In at least one embodiment, providing power equally at the same time to the actuators 116, 120, 124, and 130 refers to the flap control unit 140 monitoring the output of the control signals of the actuators 116, 120, 124, and 130. The control signals automatically adjust the power based on loading conditions, deviations in accuracy of the motors, and the like. Mechanical systems have a certain accuracy in relation to the quality of a production process and design requirements. As such, the flap control unit 140 may adjust power in relation to loading variance between actuators, for example.

The flap control unit 140 controls operation of the actuators 116, 120, 124, and 130, and therefore the flaps 102, 104, 110, and 112. The flap control unit 140 receives a command signal from an operator (such as a pilot) through a control device, and controls the power to the actuators 116, 120, 124, and 130 to actuate the flaps 102, 104, 110, and 112 between retracted and extended positions, as dictated by command signals input by the operator.

In at least one other embodiment, the control unit 140 may be in communication with one or more sensors that may be coupled to the actuators 116, 120, 124, and 128 and/or the flaps 102, 104, 110, and 112. The sensors may be used to provide positional and/or motion signals that allow the control unit 140 to control motion of the actuators 116, 120, 124, and 128 to synchronize motion of the flaps 102, 104, 110, and 112.

As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the flap control unit 140 may be or include one or more processors that are configured to control operation of the flaps 102, 104, 110, and 112, as described above.

The flap control unit 140 is configured to execute a set of instructions that are stored in one or more storage elements (such as one or more memories), in order to process data. For example, the control unit 140 may include or be coupled to one or more memories. The storage elements may also store data or other information as desired or needed. The storage elements may be in the form of an information source or a physical memory element within a processing machine.

The set of instructions may include various commands that instruct the flap control unit 140 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the flap control unit 140. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 130 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 3:
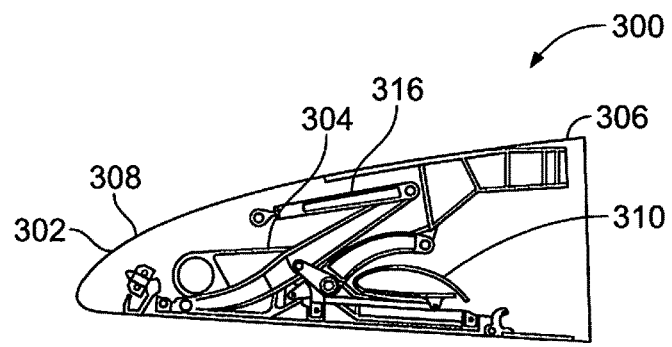
FIG. 3 illustrates a lateral internal view of a leading edge flap of a wing in a retracted position, according to an embodiment of the present disclosure.
Figure 4:
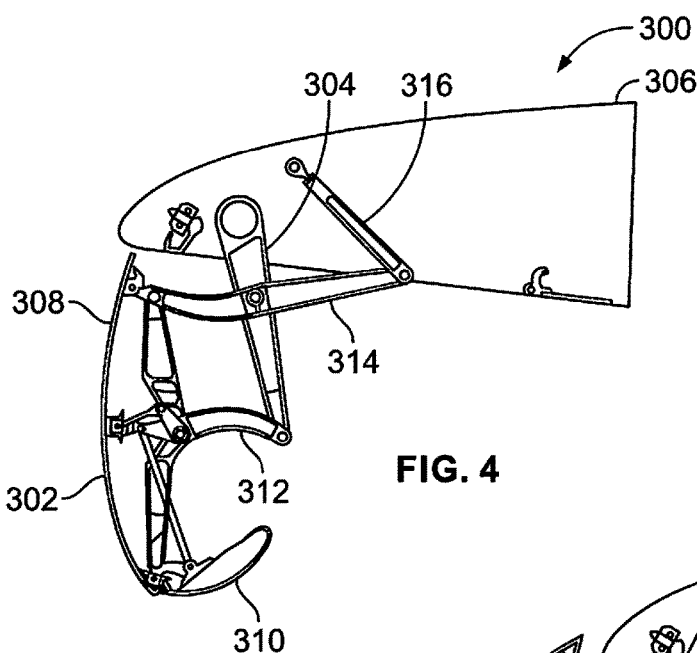
FIG. 4 illustrates a lateral internal view of a leading edge flap of a wing in an intermediate position, according to an embodiment of the present disclosure.
Figure 5:
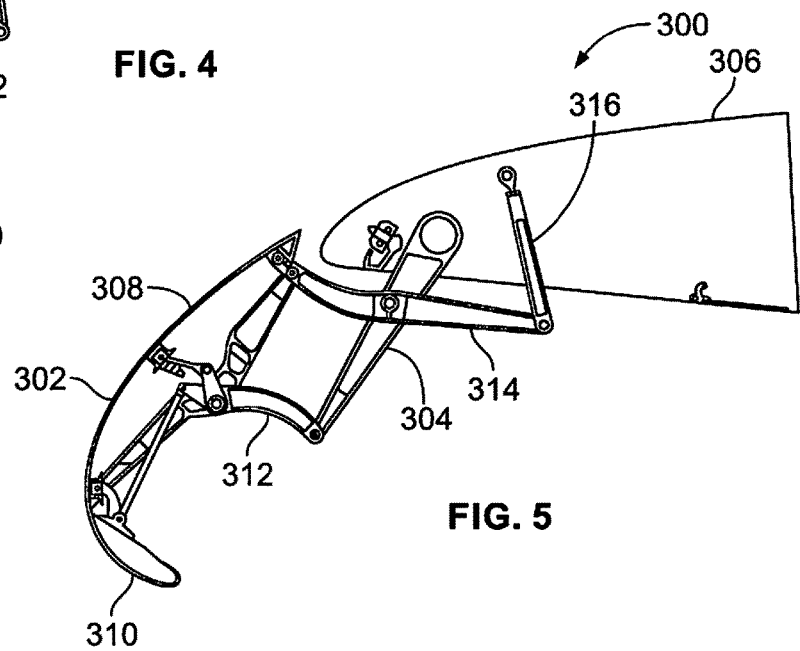
FIG. 5 illustrates a lateral internal view of a leading edge flap of a wing in a fully-extended position, according to an embodiment of the present disclosure.

FIG. 3 illustrates a lateral internal view of a leading edge flap 300 of a wing 302 in a retracted position, according to an embodiment of the present disclosure. FIG. 4 illustrates a lateral internal view of the leading edge flap 300 of the wing 302 in an intermediate position. FIG. 5 illustrates a lateral internal view of the leading edge flap 300 of the wing 302 in a fully-extended position. Referring to FIGS. 3-5, the wing 302 is an example of either of the wings 106 or 114 shown in FIG. 1. Further, the leading edge flap 300 is an example of either of the flaps 102 or 110.

The flap 300 is moveably coupled to a main body 306 of the wing 302 through a link 304. The link 304 is an example of any of the links shown and described with respect to FIG.

1. The link 304 may be a lever that is operatively coupled to an actuator (not shown in FIG. 1), such as a stepper motor, that is in communication with the flap control unit 140. The flap 300 may include an outer curved panel 308 having a foldable nose 310. A link 312 (such as a camber program link) may couple an end of the link 304 to the flap 300. Another link 314 (such as a drive program link) may couple the flap 300 to an intermediate portion of the link 304 and an idler 316. As described above, the control unit 140 is configured to control the flap 300 between the retracted position shown in FIG. 3 and the fully-extended position shown in FIG. 5 based on command signals input from an operator (such as a pilot).

The flap 300 may be moveably coupled to the wing 302 through various other linkages, drive mechanisms, and the like, other than shown. Further, while the flap 300 is shown as a leading edge flap, the flap 300 may be configured as a trailing edge flap.

Figure 6:
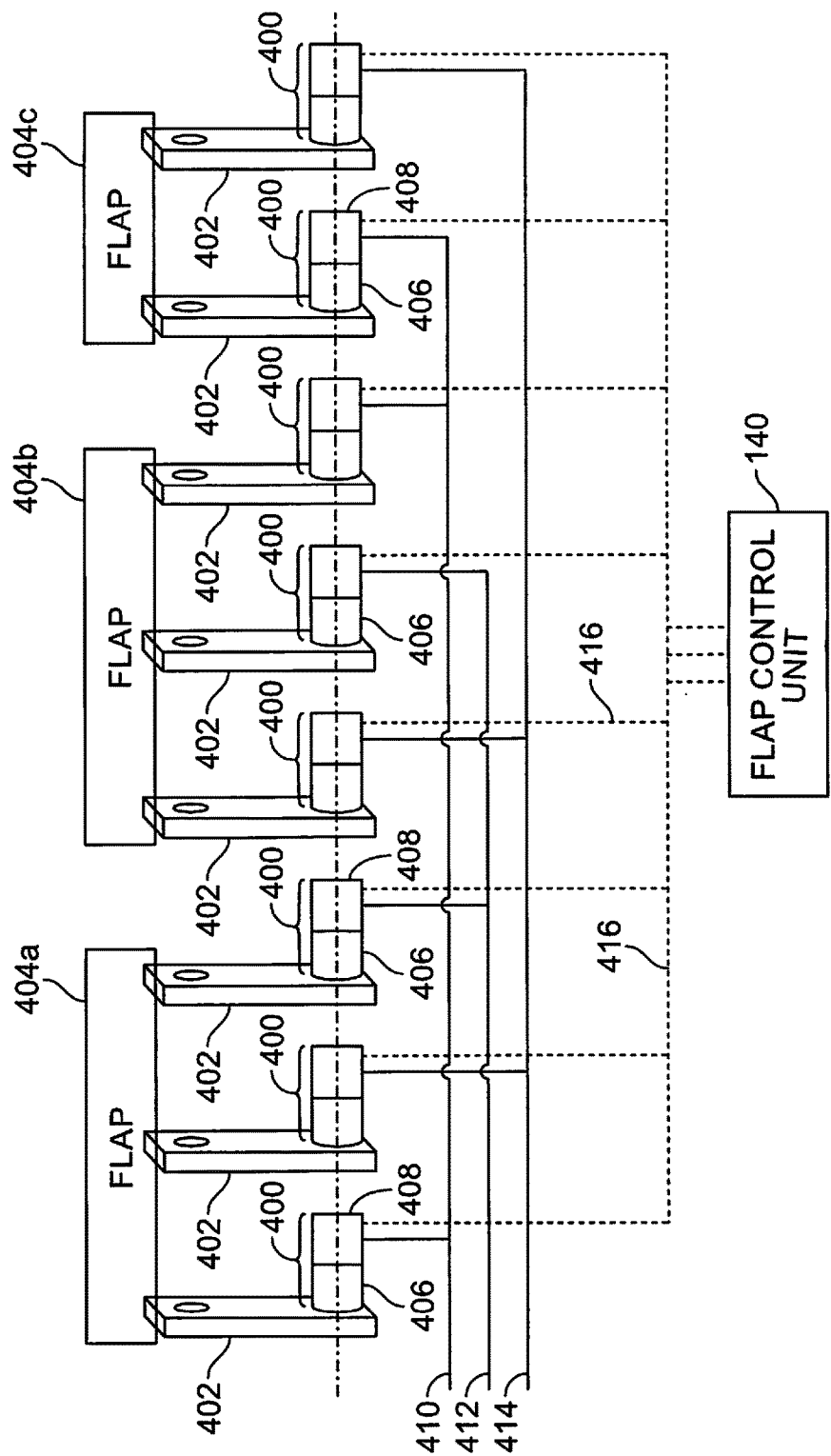
FIG. 6 illustrates a schematic diagram of a flap control unit operatively coupled to actuators that connect to links that are coupled to flaps, according to an embodiment of the present disclosure.

FIG. 6 illustrates a schematic diagram of the flap control unit 140 operatively coupled to actuators 400 that connect to links 402 that are coupled to flaps 404, according to an embodiment of the present disclosure The actuators 400 are examples of any of the actuators shown and described in FIG. 1. The links 402 are examples of any of the links shown and describes in FIGS. 1 and 3-5. The flaps 404 are examples of any of the flaps shown in FIG. 1.

As shown, each of the flaps 404 may be coupled to at least two actuators 400 through at least two links 402. Optionally, each of the flaps 404 may be coupled to more or less actuators 400 through more or less links 402 than shown.

Each actuator 400 may be a stepper motor, as described above, and may include a motor 406 coupled to a microcontroller 408. Each of the motors 406 may be operatively coupled to a power bus 410, 412, or 414. For example, the motors 406 that control operation of the flap 404a may be coupled to a first power bus 410. The motors 406 that control operation of the flap 404b may be coupled to a second power bus 410. The motors 406 that control operation of the flap 404c may be coupled to a third power bus 410. Optionally, each motor 406 may be coupled to a separate and distinct power bus. In at least one other embodiment, a single power bus may be coupled to each of the motors 406. The power buses 410, 412, and 414 are configured to provide power signals from a power source to each of the motors 406 when directed by the flap control unit 140 to move the flaps 404a, 404b, and 404c based on command signals input by an operator of the aircraft. The power signals drive the motors 406.

The flap control unit 140 may be coupled to each of the microcontrollers 408 through a control bus 416. The flap control unit 140 provides control signals to the microcontrollers 408 through the control bus 416. The flap control unit 140 may include redundant controllers that communicate with the microcontrollers 408. For example, the flap control unit 140 may include a first controller in communication with the microcontrollers 408 associated with the flap 404a, a second controller in communication with the microcontrollers 408 associated with the flap 404b, and a third controller in communication with the microcontrollers 408 associated with the flap 404c. The separate and distinct controllers may be used to provide control signals to each of the actuators, thereby providing control redundancy.

The multiple power buses shown in FIG. 6 may provide primary and secondary power sources. The multiple power buses may provide redundancy that ensures that power is delivered to the actuators, even if one of the power buses is operating at a reduced capacity. Similarly, multiple control buses may be used to provide control redundancy that ensures that control signals are delivered to the actuators, even if one of the control buses is operated at a reduced capacity.

In at least one other embodiment, instead of separate and distinct power and control buses, the flap control unit 140 may be coupled to each of the microcontrollers 408 through a single bus that is configured to provide power and control signals thereto.

In operation, the flap control unit 140 receives a command signal, such as input by an operator through a control device (for example, one or more buttons, levers, knobs, control sticks, handles, and/or the like within a cockpit). Based on the input command signal received from the control device, the flap control unit 140 provides flap control signals to the microcontrollers 408, which operate the motors 406 accordingly. As stepper motors, the actuators 400 may be automatically synchronized based on the power provided to the motors 406, for example. For example, when each of the actuators 400 receives an equal amount of power at the same time, the actuators 400 move at the same rate into the same positions.

In at least one other embodiment, the microcontrollers 408 may not be directly coupled to the motors 406. Instead, the microcontrollers 408 may be remotely located from the motors 406 and connected through one or more wired or wireless connections.

In at least one other embodiment, the actuators 400 may not include the microcontrollers 408. Instead, the flap control unit 140 may be directly coupled to the motors 406 through the control bus 416 and operate the motors 406 in a direction fashion.

The flap control unit 140 may monitor one or more electrical signals supplied or otherwise provided to the actuators 400 to ensure that movement of the actuators 400 is synchronized. For example, the flap control unit 140 may monitor the current load supplied to each of the actuators 406 associated with the flap 404a. If the current loads supplied to each of the actuators 400 are equal, the flap control unit 140 determines that the actuators 400 associated with the flap 404a are synchronized (as the actuators 400 may be stepper motors). If, however, the current loads supplied to each of the actuators 400 differ, then the flap control unit 140 may determine that the actuators 400 associated with the flap 404a are not synchronized, and may then output a warning signal to an operator, technician or the like. In short, the flap control unit 140 may monitor the actuators associated with a particular flap to determine that the electrical input supplied to each of the actuators is the same, thereby ensuring synchronization of the actuators 400.

The flap control unit 140 monitors electrical signals supplied, output, or otherwise provided to actuators associated with a flap. The electrical signals are provided to the actuators to operate and/or otherwise control the actuators. The electrical signals may be voltage or current signals, for example. In at least one embodiment, the actuators are stepper motors. As such, if electrical signals(s) of equal magnitude, phase, and/or timing are provided to the stepper motors, the stepper motors operate synchronously together (as the same applied current, for example, synchronously actuates the stepper motors at the same rate and into the same position). In this manner, the flap control unit 140 determines that the actuators are synchronized by monitoring the electrical signals provided to the actuators associated with a flap.

The actuators associated with a flap may not be mechanically linked. That is, the actuators are not connected together through a linking device (such as a torque tube) that would otherwise synchronize movement of the actuators, but add mass to the wing. Instead, as described above, the separate and distinct actuators are synchronized such as through electrical signals supplied thereto. As noted, two actuators in the form of two stepper motors synchronously operate when provided with electrical signals of the same magnitude at the same time. For example, electrical signal(s) provided to actuators through a common bus synchronize the actuators.

Figure 7:
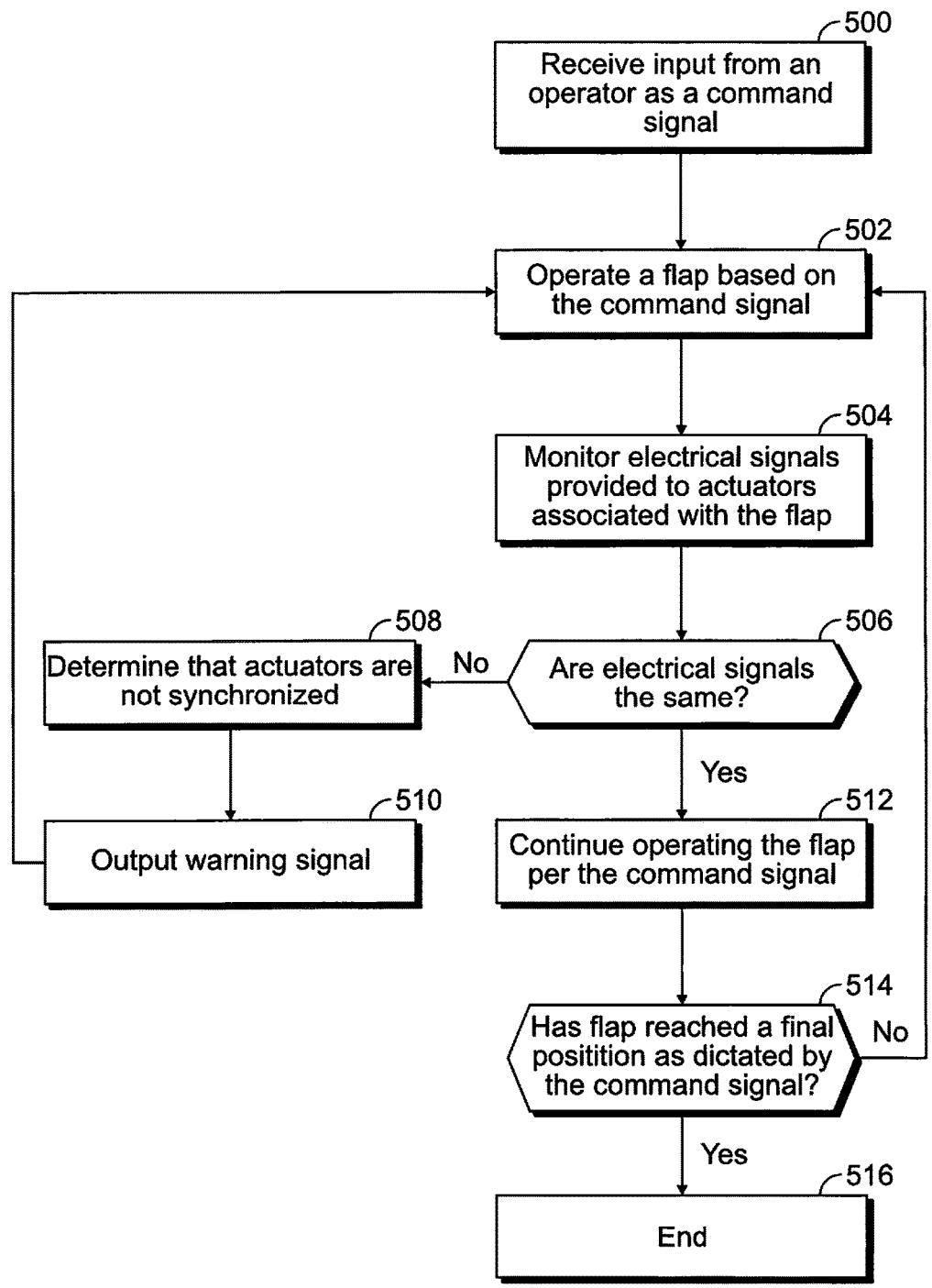
FIG. 7 illustrates a flow chart of a method of operating a flap of a wing of an aircraft, according to an embodiment of the present disclosure.

FIG. 7 illustrates a flow chart of a method of operating a flap of a wing of an aircraft, according to an embodiment of the present disclosure. The flap control unit 140 shown in FIG. 1 may be configured to operate the flap as shown and described with respect to FIG. 7. The flap may be a leading edge flap or a trailing edge flap. The flap control unit 140 may be configured to control each of the flaps of the aircraft as shown and described with respect to FIG. 7.

At 500, an input from an operator of the aircraft is received as a command signal. For example, the flap control unit 140 receives the command signal from a control device through one or more wired or wireless connections.

At 502, the flap is operated based on the command signal. As described above, the flap control unit 140 operates the actuators associated with the flap. At 504, electrical signals provided to the actuators associated with the flap are monitored. The electrical signals may be voltage signals, current signals, and/or the like. The flap control unit 140 is in communication with the actuators and detects the electrical signals.

At 506, it is determined whether the electrical signals that drive the actuators associated with the flap are equal. For example, the same electrical signals supplied to each actuator may automatically synchronize motion of the actuators (such as if the actuators are stepper motors). If the electrical signals are not the same, the method proceeds from 506 to 508, in which it is determined (such as by the flap control unit 140) that the actuators are not synchronized. Then, a warning signal (such as an audio and/or visual signal) is output at 510 (such as by the flap control unit 140), and the method returns to 502.

If, however, the electrical signals are equal at 506, the method proceeds from 506 to 512, in which the flap continues to be operated (such as by the flap control unit 140) per the command signal. At 514, it is determined whether the flap has reached a final position as dictated by the command signal. If not, the method returns to 502 from 514. If, however the flap has reached the final position at 514, the method proceeds from 514 to 516, in which the method ends.

Figure 8:
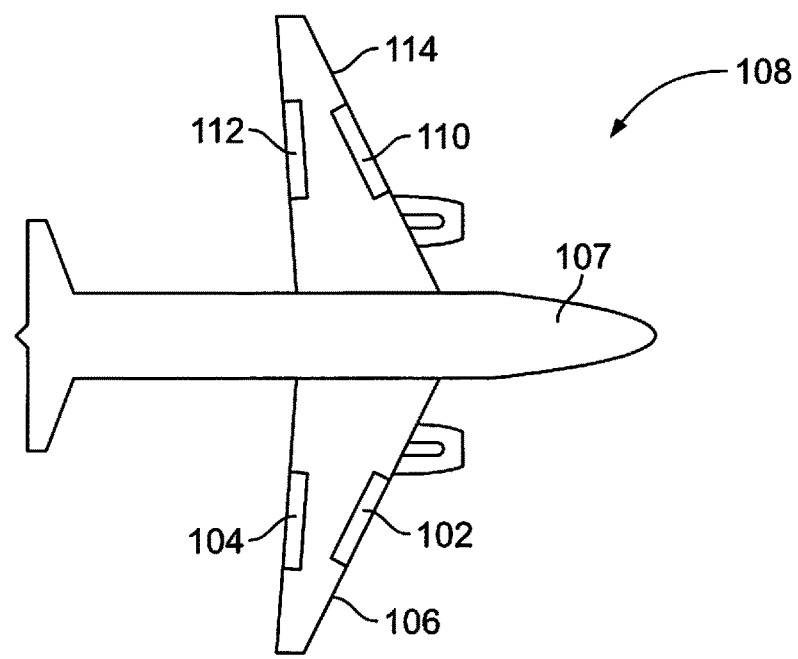
FIG. 8 illustrates a top plan view of an aircraft, according to an embodiment of the present disclosure.

FIG. 8 illustrates a top plan view of the aircraft 108, according to an embodiment of the present disclosure. The aircraft 108 includes a fuselage 107 and the wings 106 and 114 extending from respective right and left sides of the fuselage 107. The wings 106 and 114 include the extendable leading edge flaps 102 and 110 and the extendable trailing edge flaps 104 and 112 that are configured to increase drag or lift when extended. The flaps 102, 104, 110, and 112 are part of a high-lift system implemented in the aircraft 108. Although one leading edge flap one trailing edge flap is illustrated on each wing 106 and 114, it is to be understood that multiple flaps may be installed on each of the wings 106 and 114.

Referring to FIGS. 1 and 8, the flap control unit 140 extends or retracts the flaps 102, 104, 110, and 112 in response to command signal input by a pilot, a flight control system, and/or the like. In at least one embodiment, the flap control unit 140 provides electrical power to each of the actuators 116, 120, 124, and 130 (electrical power may also or alternatively be supplied by the aircraft electrical power system). The actuators 116, 120, 124, and 130 may be electrically controlled, and may therefore be referred to as Electrical-Mechanical Actuators (EMAs). The flap control unit 140 monitors operation of the actuators 116, 120, 124, and 130 such as through one or more electrical signals and/or sensors to ensure that the actuators 116, 120, 124, and 130 associated with a particular flap are synchronized.

As described above, embodiments of the present disclosure provide flap control systems and methods that are used to control leading and/or trailing edge flaps of wings of an aircraft. The flap control system includes actuators (such as electromechanical actuators) that are coupled to flaps. The actuators are in communication with one or more flap control units that control operation of the flaps.

Embodiments of the present disclosure provide a hydraulic-free, electronically-interconnected direct drive flap actuator control system for aircraft. Flap motion is synchronized without the use of a torque tube that interconnects the flaps together. The lack of hydraulic connections allows for installation and testing of flap actuation to be performed further upstream in a build sequence for a wing. Accordingly, the wing may be delivered to a final assembly location with a fully installed and tested flap system.

Embodiments of the present disclosure provide flap control systems and methods that may be devoid of torque tubes and hydraulic actuation systems. Accordingly, embodiments of the present disclosure increase flexibility of component placement, improve control of the flaps, and lower the weight and complexity of a wing, for example.

In at least one embodiment, the flap control systems and methods include a leading edge or trailing edge flap assembly for an airplane wing that includes a plurality of synchronous electromechanical motors that provide independent control of a particular flap. A synchronous motor may be positioned on each link (such as a lever or drive arm) of a flap. The motors may be connected to primary and secondary power sources as well as primary and redundant flap control units.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for controlling one or more flaps of a wing of an aircraft, the system comprising:
    a first flap moveably secured to a first wing of the aircraft, the first flap being moveable between an extended position and a retracted position;
    a first actuator coupled to the first flap;
    a second actuator coupled to the first flap; and
    a flap control unit in communication with the first and second actuators, wherein the flap control unit is configured to:
        operate the first and second actuators to move the first flap between retracted and extended positions;
        monitor a first electrical signal provided to the first actuator;
        monitor a second electrical signal provided to the second actuator; and
        determine that the first and second actuators are synchronized by monitoring the first and second electrical signals.

2. The system of claim 1, wherein the flap control unit is configured to determine that the first and second actuators are synchronized when the first and second electrical signals are equal.

3. The system of claim 1, wherein each of the first and second electrical signals is one of a voltage or a current.

4. The system of claim 1, wherein the flap control unit determines that the first and second actuators are synchronized without the use of a sensor.

5. The system of claim 1, wherein the first actuator is a first stepper motor, and wherein the second actuator is a second stepper motor.

6. The system of claim 1, wherein the first and second actuators are not mechanically linked together through a linking device.

7. The system of claim 1, wherein the first flap is a leading edge flap or a trailing edge flap.

8. The system of claim 1, further comprising:
    a second flap moveably secured to the first wing of the aircraft, the second flap being moveable between an extended position and a retracted position;
    a third actuator coupled to the second flap;
    a fourth actuator coupled to the second flap,
    the flap control unit is further configured to:
        operate the third and fourth actuators to move the second flap between retracted and extended positions;
        monitor a third electrical signal provided to the third actuator;
        monitor a fourth electrical signal provided to the fourth actuator; and
        determine that the third and fourth actuators are synchronized by monitoring the third and fourth electrical signals.

9. The system of claim 1, further comprising at least one power bus coupled to the first and second actuators, wherein the at least one power bus provides power signals to the first and second actuators from a source of power.

10. The system of claim 1, further comprising at least one control bus that couples the flap control unit to the first and second actuators, wherein the flap control unit provides control signals to the first and second actuators through the at least one control bus.

11. A method of controlling one or more flaps of a wing of an aircraft, the method comprising:
    receiving a command signal that is input by an operator of the aircraft;
    operating first and second actuators coupled to a first flap of the wing of the aircraft based on the command signal to move the first flap between retracted and extended positions;
    monitoring a first electrical signal provided to the first actuator;
    monitoring a second electrical signal provided to the second actuator; and
    determining that the first and second actuators are synchronized based on the monitoring operations, wherein the determining operation comprises determining that the first and second actuators are synchronized when the first and second electrical signals are equal.

12. The method of claim 11, wherein each of the first and second electrical signals is one of a voltage or a current.

13. The method of claim 11, wherein the monitoring and determining operation occur without the use of a sensor.

14. The method of claim 11, wherein the first actuator is a first stepper motor, and wherein the second actuator is a second stepper motor.

15. The method of claim 11, wherein the first and second actuators are not mechanically linked together through a linking device.

16. The method of claim 11, wherein the first flap is a leading edge flap or a trailing edge flap.

17. The method of claim 11, further comprising:
    operating third and fourth actuators coupled to a second flap of the wing of the aircraft based on the command signal to move the second flap between retracted and extended positions;
    monitoring a third electrical signal provided to the third actuator;
    monitoring a fourth electrical signal provided to the fourth actuator; and
    determining that the third and fourth actuators are synchronized based on the monitoring operations.

18. The method of claim 11, further comprising:
    providing power signals to the first and second actuators through at least one power bus; and
    providing control signals to the first and second actuators through at least one control bus.

19. A system for controlling one or more flaps of a wing of an aircraft, the system comprising:

a first flap moveably secured to a first wing of the aircraft, the first flap being moveable between an extended position and a retracted position;

a second flap moveably secured to the first wing of the aircraft, the second flap being moveable between an extended position and a retracted position;

a first stepper motor coupled to the first flap;

a second stepper motor coupled to the first flap, wherein the first and second stepper motors are not mechanically linked through a linking device;

a third stepper motor coupled to the second flap;

a fourth stepper motor coupled to the second flap; and a flap control unit in communication with the first and second stepper motors, wherein the flap control unit is configured to:

operate the first and second stepper motors to move the first flap between retracted and extended positions;

operate the third and fourth stepper motors to move the second flap between retracted and extended positions;

monitor a first electrical signal provided to the first stepper motor;

monitor a second electrical signal provided to the second stepper motor;

monitor a third electrical signal provided to the third stepper motor;

monitor a fourth electrical signal provided to the fourth stepper motor;

determine that the first and second stepper motors are synchronized when the first and second electrical signals are equal, wherein the flap control unit determines that the first and second stepper motors are synchronized without the use of a sensor; and determine that the third and fourth actuators are synchronized by monitoring the third and fourth electrical signals.

20. The system of claim 19, further comprising:

at least one power bus coupled to the first, second, third, and fourth stepper motors, wherein the at least one power bus provides power signals to the first, second, third, and fourth actuators from a source of power; and at least one control bus that couples the flap control unit to the first, second, third, and fourth stepper motors, wherein the flap control unit provides control signals to the first, second, third and fourth stepper motors through the at least one control bus.

* * * * *